United States Patent [19]
Lee
[11] 4,016,765
[45] Apr. 12, 1977

[54] PIPETTE CONTROLLER WITH GRADUATE READING PLUNGER

[76] Inventor: Tsao-Piao Lee, No. 89-1, Chang Chun Road, 2nd Fl., Taipei, China /Taiwan, 104

[22] Filed: May 7, 1976

[21] Appl. No.: 684,258

[52] U.S. Cl. .......... 73/425.6; 23/259; 23/292; 222/50

[51] Int. Cl.² .......... B01L 3/02; G01N 1/14

[58] Field of Search .......... 23/259, 292; 73/425.4 P, 425.6; 222/46, 50, 309, 48; 141/18, 26, 27

[56] References Cited

UNITED STATES PATENTS

| | | | |
|---|---|---|---|
| 3,184,122 | 5/1965 | Nerenberg | 23/259 X |
| 3,343,539 | 9/1967 | Moorhouse | 73/425.6 X |
| 3,492,876 | 2/1970 | Bull et al. | 23/259 X |
| 3,525,592 | 8/1970 | Buckley | 23/259 X |
| 3,712,794 | 1/1973 | Farr | 23/259 |
| 3,805,998 | 4/1974 | Croslin | 23/259 X |
| 3,855,867 | 12/1974 | Roach | 73/425.6 |

*Primary Examiner*—Joseph Scovronek

[57] ABSTRACT

This invention provides a pipette controller comprising a cylinder-piston assembly with facilities of graduate reading device for presetting the volume of liquid to be pipetted, a hand control for natural drainage of liquid and heat barrier for preventing quick penetration of ambient temperature or operator's body temperature, such that convenient operation and excellent control of pipetting may be obtained.

10 Claims, 6 Drawing Figures

PIPETTE CONTROLLER WITH GRADUATE READING PLUNGER

BACKGROUND OF THE INVENTION

This invention relates to a pipette controller.

For the operation of pipetting, one of the traditional ways is that liquids are taken up into a pipette by suction with operator's mouth and are kept therein by blocking one end of the pipette with operator's finger tip, then the liquids inside the pipette are delivered by removal or release of the blocking finger tip. It is readily seen that pipetting in such manner is quite inconvenient and unsuitable, because the amount of liquid being taken up and/or being delivered can't be well controlled, and also it is not hygienic, especially, when the liquid to be pipetted is destructive to one's health or has an unpleasing odor.

To obviate the necessity of using the operator's mouth and finger tip, it has been proposed to provide at one end of the pipette a controlling device for suction or exhaust operation. In the art of this controlling device, a cylinder-piston assembly has been employed, the piston is operable to slide back and forth inside the cylinder by means of a piston rod, which is connected to the piston and is held in resiliently depressible condition with a coiled spring, while the base of the cylinder is provided with a port adapted to connect with the mouthpiece of a pipette, such that, the travel of the piston inside the cylinder will control the suction or exhaust of the pipette when the jet of the pipette connected at the port of the cylinder is inserted into the liquid to be pipetted.

Although the above-mentioned controlling device is able to eliminate the intervention of operator's mouth and finger tip, the amount of liquid being sucked in or being delivered is still out of control.

SUMMARY OF THE INVENTION

Therefore, it is an object of this invention to provide a pipette controller devised to eliminate the problems with liquid drawing by mouth and delivery control by finger tip.

It is a further object of this invention to provide a pipette controller devised to permit convenient operation and excellent control for pipetting with the facilities of the graduate reading device for presetting the volume of liquid to be filled, the a hand controller for natural drainage of liquid and heat barrier for preventing quick penetration of body temperature through the operator's hand into the pipette controller, which body temperature will result in the change of the air pressure inside the pipette controller and thus affect the stability of the liquid level drawn up.

According to this invention, the pipette controller comprises a cylinder having, at its base, a port provided with a rubber seal and a collet for tightly connecting with the mouthpiece of a pipette inserted therein; a cap member of substantially U-shaped vertical section coaxially mounted on the upper end of the cylinder; a piston capable of travelling back and forth inside the cylinder; a threaded rod having one end connected to the piston and the other end connected with a plunger movably extending through an opening on the top of the cap member, said plunger includes radial flange on the lower end thereof to be biased against the inner side of the top of the cap member by a coiled spring wound around the threaded rod between the plunger and the cylinder for normally maintaining the upper end of the plunger projected outside the cap member and providing restoring force therefor; wherein, said plunger includes a hollow tubular member of transparent material, a lid closing the upper end of the tubular member, a nut member fixedly connected to the lower end of the tubular member, a threaded opening extending through the nut member for threadedly engaging and guiding the upper end of the threaded rod such that the upper end of the thread rod will be caused to ascend or descend with respect to the wall of the tubular member when the plunger is turned; and, a set of graduations spaced on the surface of the wall of the tubular member in cooperation with an indicating means provided on the upper-most end of the threaded rod inside the tubular member to indicate the volume of the liquid being sucked in by the travel of the piston.

In a preferable embodiment of this invention, the base of the cylinder of the pipette controller is further provided with a second port communicating to atmosphere via a channel, which channel is normally closed by means of an operable lever system attached to the cylinder for controlling the natural drainage of the liquid. The lever system can be actuated to open the channel, through which the atmosphere pressure is directed into the space between the piston and the pipette connected at the first port, so as to effect a natural drainage of liquid via the jet of the pipette. The cylinder of the controller is double-walled so as to have an annular space serving as a heat barrier between the inner and outer walls, and, the outer surface of the cylinder is provided with a layer of heat insulating material to prevent the influence of ambient tmeperature or operator's body temperature on the air pressure inside the cylinder.

This invention will become more fully apparent from the detailed description with reference to the accompanying drawings which are given by ay of illustration only, and thus are not limitative of this invention.

BRIEF DISCRIPTION OF THE DRAWING

DETAILED DESCRIPTION OF PREFERRED EMBODIMENT

Figure 1:
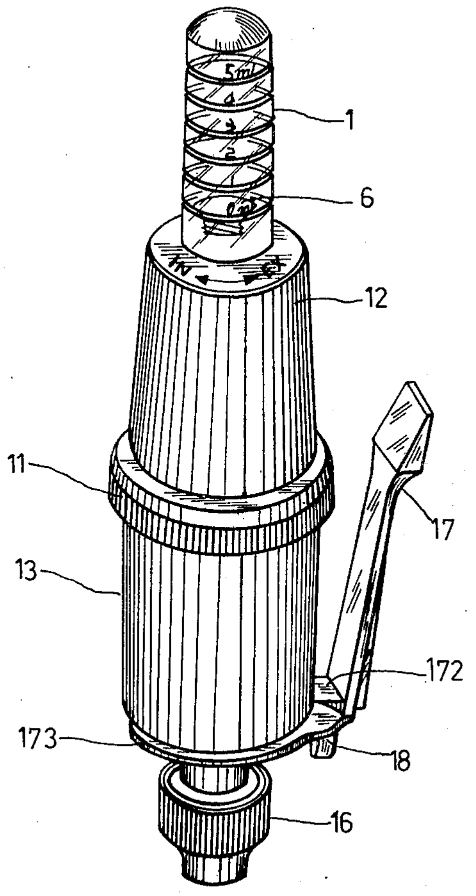
FIG. 1 is a perspective view of one embodiment of the pipette controller according to this invention.
Figure 2:
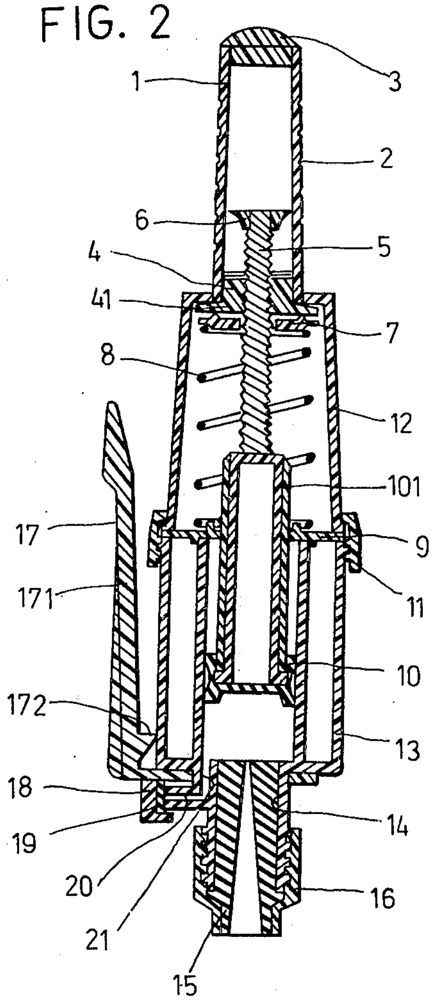
FIG. 2 is a longitudinal sectional view of the pipette controller shown in FIG. 1.

Referring now to FIGS. 1 and 2 to the accompanying drawings, there is shown an embodiment of this invention. The pipette controller includes a cylinder, generally indicated at 13, having an inner and outer cylindrical wall and a base. Interiorly the space defined by the inner wall and the base of the cylinder 13, there is provided with a piston 10, which is connected to a threaded rod 5 through an adapter 101. At the base of the cylinder 13, a port 14 is provided with a seal member 15 and a collet 16 in such a manner that the mouthpiece of a pipette inserted therein may be tightly connected by screwing up the collet 16. The upper end of the cylinder 13 is covered by a fixing panel 9 having a central hole permitting the adaptor 101 to extend therethrough, and is connected to a cap member 12 of generally U-shaped section by means of a connection ring 11.

The upper end of the threaded rod is connected to a plunger 1, which will be further described hereinbelow. The plunger 1 movably extends from inside the cap member 12 to outside through a central hole provided in the top of the cap member, and has a radial flange 41 to coincide with the peripheral edges of said hole in the top of the member. A coiled spring 8 wound around the threaded rod 5 is disposed between the plunger 1 and the fixing panel 9 to resiliently bias the plunger 1 to a top dead point with the flange 41 thereof in contact with the inner face of the top of the cap member 12. Therefore, the travel of the piston 10 inside the cylinder 13 may be effected by depressing and releasing the plunger 1. In other words, a pipette connected at the port 14 may be pipetted by depressing and releasing the plunger.

It should be noted that, the upper-most end of the coiled spring 8 is terminated at a washer 7, which is aligned with the plunger 1 and has a surface including nipple-like protuberances in contact with the lower end surface of the plunger to decrease the friction when the plunger 1 is turned, and also, for the purpose of convenient operation and excellent control of pipetting, the plunger 1 and the threaded rod are provided with a graduate reading device, and the base of the cylinder is provided with a hand control for natural drainage, as will be apparent from the description hereinbelow.

Figure 3:
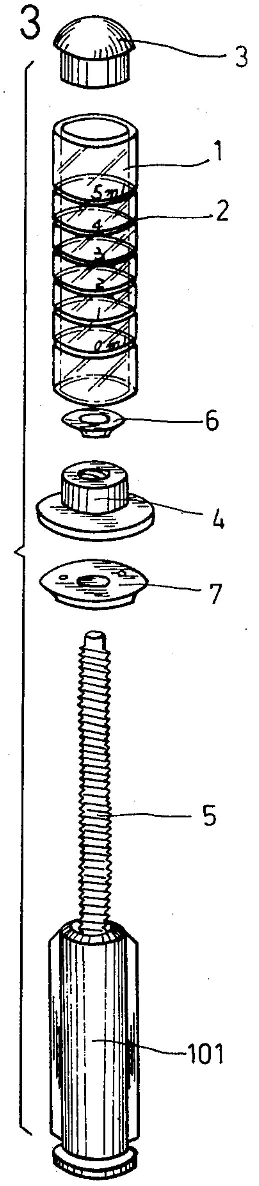
FIG. 3 is an exploded view of the graduate reading device disconnected from the pipette controller shown in FIG. 1.

As shown in FIGS. 1, 2 or 3, the plunger 1 is a tubular member of transparent material, which is closed at upper end by a lid 3, and is connected at lower end with a nut member 4. The nut member 4 has a threaded hole for threadedly engaging and guiding the upper end of the threaded rod 5, so that, the upper end of the threaded rod 5 is caused to ascend or descend with respect to the wall of the plunger when the plunger 1 is turned in either clockwise or counter clockwise direction. In other words, the position of the piston inside the cylinder may be finely adjusted by turning the plunger 1. Moreover, a set of graduations 2 is spaced on the surface of the wall of the plunger 1, which are calibrated in volume unit according to the amount of liquid pipetted by the travel of the piston, and an indicating disc 6 is fixed on the upper-most end of the rod 5 for taking readings in response to the position of the piston.

Figure 4:
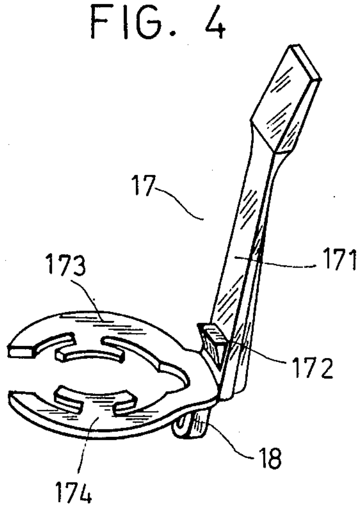
FIG. 4 is a perspective view of an operable lever system disconnected from the pipette controller of FIG. 1.

As seen from FIG. 2, the base of the cylinder is provided with a second port 21 of smaller diameter, the port 21 is communicated to atmosphere via a laterally extending channel 20. And, a hand control 17 including an operable lever system is provided at the base of the cylinder 13 to normally close the opening of the channel 20, and to open it when manually actuated on the principle of lever. The operable lever system, as best shown in FIG. 4, comprises a lever arm 171, one end of the lever arm 171 is formed with a seal holder 18, a pair of claws 173, 174 and a projection 172. The claws 173, 174 are adapted to clamp the outer wall of the port 14 at the base of the cylinder 13, in such a manner that the opening of the channel 20 is tightly closed by a seal pad 19 held by the seal holder 18, and the projection 172 is in contact with the surface of the cylinder 13, as shown in FIG. 2.

In the operation of the pipette controller shown in FIGS. 1 or 2, the collet 16 is unscrewed, and the mouthpiece of a pipette is firmly inserted into the seal 15, then the collet 16 is screw up to obtain a perfect seal. Thereafter, the volume of liquid to be pipetted is preset by turning the plunger 1 to bring the indicating disc 6 to coincide with the desired graduation. Depress the plunger 1 until the bottom dead point is reached and insert the jet of the pipette into the liquid to be pipetted, then let it return to the released position- the preset volumes of liquid to be pipetted can be obtained just with minor adjustment for precise setting on the graduation lines marked on the pipettes. Thereafter, the pipette may be discharged by gently depressing the plunger 1 to expel the liquid, or by turning the plunger 1 in the EX direction (see FIG. 1) to obtain excellent control of fractional delivery. Alternatively, when the accuracy of the pipette being used depends on natural drainage, the hand control 17 should be used, i.e. the lever arm 171 is biased toward the cylinder with the projection 172 serving as a fulcrum to slightly maintaining the seal pad 19 from the opening of the channel 20, allowing the atmosphere pressure be directed into the space between the piston and the mouthpiece of the pipette via the channel 20, and thus causing the liquid to flow out by gravity. Also, this hand control can be used to deliver volumes of liquid between graduation lines marked on the surface of the pipette.

Figure 5:
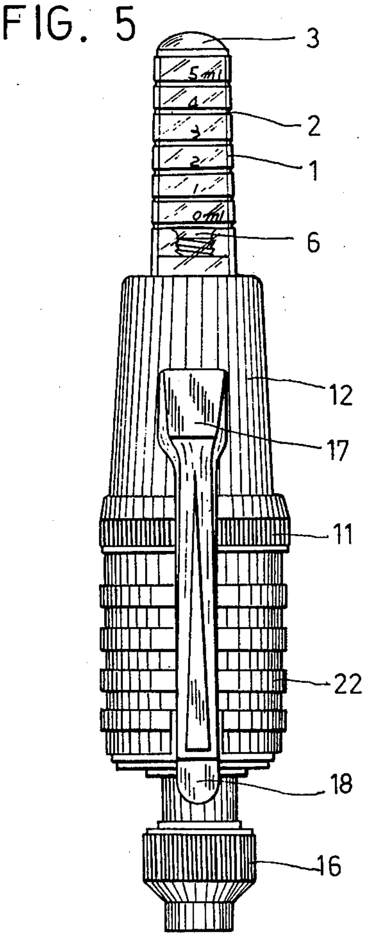
FIG. 5 is an elevational view of another embodiment of the pipette controller according to this invention, which is same as the one shown in FIG. 1 except the outer surface is provided with a heat barrier.
Figure 6:
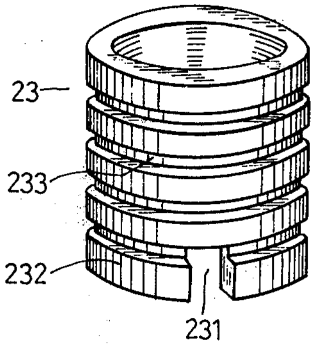
FIG. 6 is a perspective view of a heat barrier adapted to be fitted on the circumference of the cylinder of a pipette controller.

The stability of the liquid level having drawn up is susceptible to the pressure of the air inside the space between the piston and the mouthpiece of the pipette, and the pressure of the air inside the space between the piston and the mouthpiece of the pipette will be changed by the heat transmitted from the operator's hand into said space through the wall of the cylinder. Therefore, as illustrated in FIG. 2, the cylinder 13 of the pipette is double-walled to have an annular space defined between the inner and outer wall, serving as a heat barrier to retard the heat flow from the operator's hand, which holds the cylinder, to the central space of the cylinder. In addition, the outer wall of the double-walled cylinder 13 is preferably formed with a plurality of slots extending along the circumference of the cylinder and parallelly spaced apart from each other. The space defined in the slots acts as heat barrier for the cylinder as shown in FIG. 5. Alternatively, if the cylinder of the pipette controller is not double-walled and thus does not include the outer wall as that shown in FIG. 5, a separate heat barrier may be provided as shown in FIG. 6. The separate heat barrier shown in FIG. 6 is made of heat insulating material and has a generally cylindrical shape, of which the inner diameter is slightly larger than the outer diameter of the cylinder. And, the surface thereof is formed with annular projections 232 and recessses 233 in such a manner that any one of the recesses is interposed between two of the projections. The lower portion of the barrier has a cut 231 which permits the projection 172 of the hand control 17 contact with the wall of the cylinder after being fitted in position.

The pipette controller in accordance with this invention is operated by thumb and forefinger, and furnishes all functions being required for pipetting such as liquid drawing, repetitive fillings for preset volumes, and liquid dischargings inclusive of natural drainage for bulb pipettes, fractional deliverytitration capability, to deliver volumes of liquid between graduation lines marked on the pipettes, and liquid-expelling, in a safe, quick, convenient and reliable condition.

What I claim is:

1. A pipette controller comprising:

a cylinder having, at its base, a first port provided with a rubber seal and a collet for tightly connecting with the mouthpiece of a pipette inserted therein, and a second port communicating with the atmosphere via a channel;

a cap member of substantially U-shaped vertical section coaxially mounted on the upper end of the cylinder;

a piston capable of reciprocation inside the cylinder; and a threaded rod having one end connected to the piston and the other end threadedly connected with a plunger assembly extending through an opening on the top of the cap member, said plunger assembly having a radial flange on the lower end thereof and a coiled spring biasing said flange against the inner upper side of said cap member, said spring wound around the threaded rod between said flange and said cylinder for normally maintaining the upper end of the plunger assembly projected outside the cap member and providing restoring force therefor;

said plunger assembly including:

a hollow tubular member of transparent material;

a lid closing the upper end of the tubular member;

a nut member fixedly connected to the lower end of the tubular member, a threaded opening extending through the nut member for threadedly engaging and guiding the upper end of the threaded rod such that the upper end of the threaded rod will be caused to ascend or descend with respect to the wall of the tubular member when the plunger is turned in clockwise or counter clockwise direction;

a set of graduations spaced on the surface of the wall of the tubular member in cooperation with an indicating means provided on the upper-most end of the threaded rod inside the tubular member to indicate the volume of the liquid being sucked in by the travel of the piston, whereby the volume of the liquid to be pipetted may be preset by turning the plunger to have the indicating means coincide with a selected one of the graduation lines; and an operable lever assembly connected to close said channel for controlling the natural drainage of the liquid from the inserted pipette; and wherein said operable lever assembly includes:

a lever arm;

a seal pad fixed to one end of said lever arm for selectively sealing said channel;

a pair of claws at one end of said lever arm and detachably clamped to the base of said cylinder so as to cause said seal pad to airtightly close said channel; and a projection at the medial portion of said lever arm adjacent the claws, such that said natural drainage can be effected when the other end of the lever arm is biased toward the cylinder with the projection serving as a fulcrum in contact with the wall of the cylinder.

2. A pipette controller as defined in claim 1, wherein the cylinder includes an inner cylindrical wall defining a cylindrical space for the piston, and an outer cylindrical wall to define an annular space between the inner and outer wall, the annular space serving as a heat barrier.

3. A pipette controller as defined in claim 1, wherein the outer surface of the cylinder is provided with a layer of heat insulating material.

4. A pipette controller as defined in claim 3, wherein the heat insulating layer is provided with a plurality of parallel annular projections and recesses spaced along the circumference in such a manner that any one of the recesses is interposed between two of the projections.

5. A pipette controller as defined in claim 2, wherein the outside surface of the outer cylindrical wall is formed with a plurality of parallel annular projections and recesses spaced along the circumference in such a manner that any one of the recesses is interposed between two of the projections.

6. A pipette controller comprising:

a cylinder having, at its base, a first port provided with a rubber seal and a collet for tightly connecting with the mouthpiece of a pipette inserted therein, and a second port communicating with the atmosphere via a channel;

a cap member of substantially U-shaped vertical section coaxially mounted on the upper end of the cylinder;

a piston capable of reciprocation inside the cylinder; and a threaded rod having one end connected to the piston and the other end threadedly connected with a plunger assembly extending through an opening on the top of the cap member, said plunger assembly having a radial flange on the lower end thereof and a coiled spring biasing said flange against the inner upper side of said cap member, said spring wound around the threaded rod between said flange and said cylinder for normally maintaning the upper end of the plunger assembly projected outside the cap member and providing restoring force therefor;

said plunger assembly including:

a hollow tubular member of transparent material;

a lid closing the upper end of the tubular member;

a nut member fixedly connected to the lower end of the tubular member, a threaded opening extending through the nut member for threadedly engaging and guiding the upper end of the threaded rod such that the upper end of the threaded rod will be caused to ascend or descend with respect to the wall of the tubular member when the plunger is turned in clockwise or counter clockwise direction;

a set of graduations spaced on the surface of the wall of the tubular member in cooperation with an indicating means provided on the upper-most end of the threaded rod inside the tubular member to indicate the volume of the liquid being sucked in by the travel of the piston, whereby the volume of the liquid to be pipetted may be preset by turning the plunger to have the indicating means coincide with a selected one of the graduation lines; and an operable lever assembly connected to close said channel for controlling the natural drainage of the liquid from the inserted pipette.

7. A pipette controller as defined in claim 6, wherein the cylinder includes an inner cylindrical wall defining a cylindrical space for the piston, and an outer cylindrical wall to define an annular space between the inner and outer wall, the annular space serving as a heat barrier.

8. A pipette controller as defined in claim 6, wherein the outer surface of the cylinder is provided with a layer of heat insulating material.

9. A pipette controller as defined in claim 8, wherein the heat insulating layer is provided with a plurality of parallel annular projections and recesses spaced along the circumference in such a manner that any one of the recesses is interposed between two of the projections.

10. A pipette controller as defined in claim 7, wherein the outside surface of the outer cylindrical wall is formed with a plurality of parallel annular projections and recesses spaced along the circumference in such a manner that any one of the recesses is interposed between two of the projections.

* * * * *